US008914135B2

(12) United States Patent
Daraiseh et al.

(10) Patent No.: US 8,914,135 B2
(45) Date of Patent: Dec. 16, 2014

(54) INTEGRATED MONITORING, CONTROL AND EQUIPMENT MAINTENANCE AND TRACKING SYSTEM

(71) Applicant: Saudi Arabian Oil Company, Dhahran (SA)

(72) Inventors: Abdelghani Daraiseh, Dhahran (SA); Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/174,085

(22) Filed: Feb. 6, 2014

(65) Prior Publication Data

US 2014/0156033 A1 Jun. 5, 2014

Related U.S. Application Data

(62) Division of application No. 13/121,516, filed as application No. PCT/US2009/058985 on Sep. 30, 2009, now Pat. No. 8,649,888.

(60) Provisional application No. 61/194,878, filed on Sep. 30, 2008.

(51) Int. Cl.
*G05B 9/02* (2006.01)
*G06F 11/00* (2006.01)
*G05B 23/02* (2006.01)
*G05B 19/418* (2006.01)

(52) U.S. Cl.
CPC ........ *G05B 9/02* (2013.01); *G05B 2219/31026* (2013.01); *G05B 19/4184* (2013.01); *G05B 2219/24152* (2013.01)
USPC ............................................. 700/79; 714/37

(58) Field of Classification Search
CPC ................. G05B 19/0426; G05B 2219/31455; G21C 17/00; B30B 9/3007; G21D 3/00
USPC ........ 700/11, 19–21, 79–82; 714/1, 2, 25, 37; 340/500, 501, 506–508, 514, 516, 517, 340/1.1, 3.1, 3.3–3.32, 3.43, 3.44, 3.9
See application file for complete search history.

(56) References Cited

U.S. PATENT DOCUMENTS

| 7,002,462 | B2 * | 2/2006 | Welch | 340/506 |
| 7,145,450 | B2 * | 12/2006 | Brown | 340/506 |
| 7,784,062 | B2 * | 8/2010 | Droba | 719/318 |
| 8,275,847 | B2 * | 9/2012 | Lewis | 709/207 |
| 2008/0095196 | A1 * | 4/2008 | Weatherhead et al. | 370/503 |
| 2011/0066297 | A1 * | 3/2011 | Saberi et al. | 700/287 |

* cited by examiner

*Primary Examiner* — Crystal J Barnes-Bullock
(74) *Attorney, Agent, or Firm* — Abelman, Frayne & Schwab

(57) ABSTRACT

An integrated monitoring, control and equipment maintenance and tracking system and method is provided for managing a plurality of field devices. The integrated and coordinated system includes the monitoring and control system that uses safety subsystem field device data and process control subsystem field device data. When a compromised field device is determined, e.g., by the safety system and/or the process control system, information about testing, maintenance, repair or replacement is conveyed to the monitoring and control system. This information is used to modify the work orders created by the equipment maintenance and tracking system processor such that the compromised field device, or a field device at a location of the compromised field device, is not subject to unnecessary or excessively redundant testing.

8 Claims, 8 Drawing Sheets

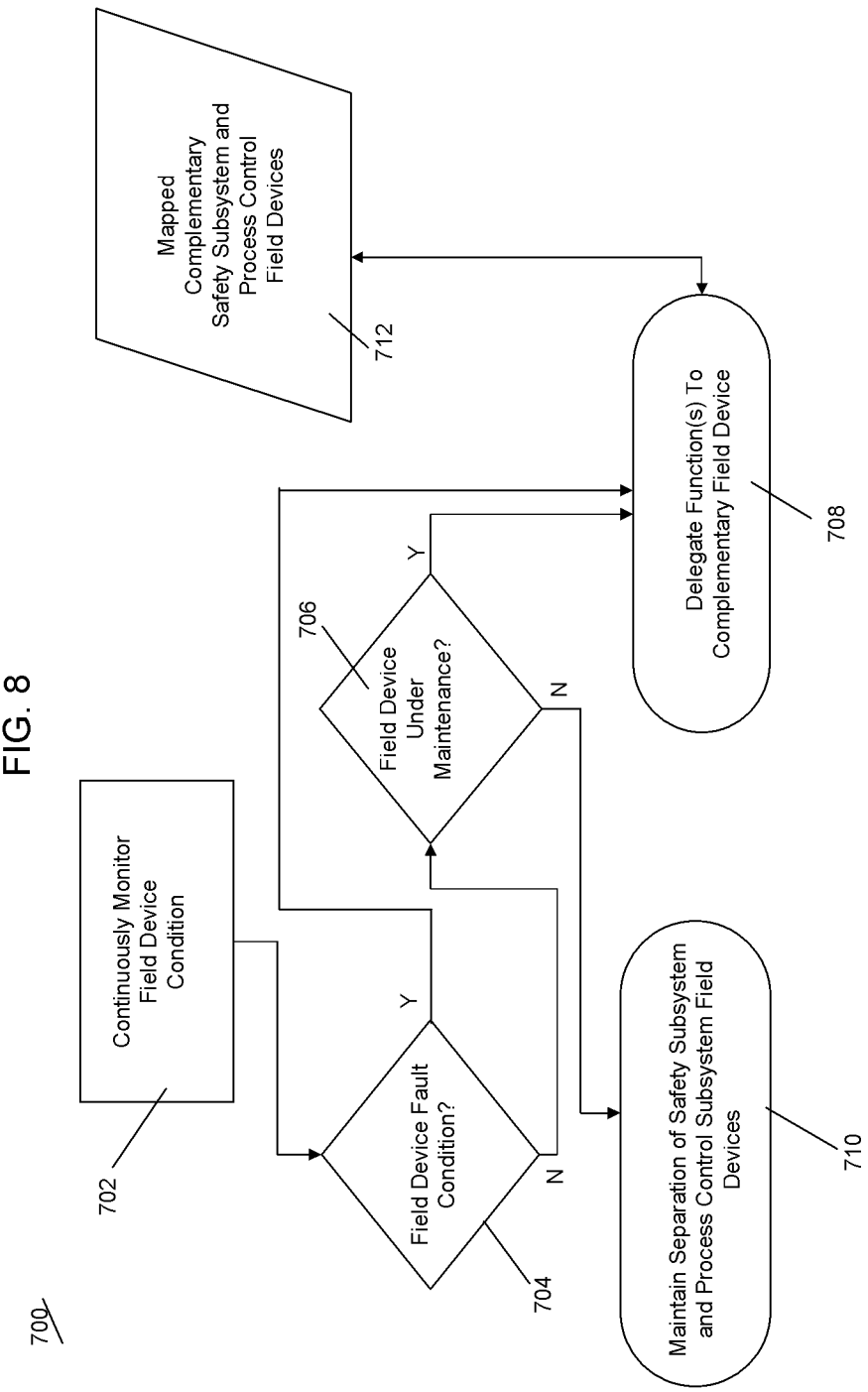

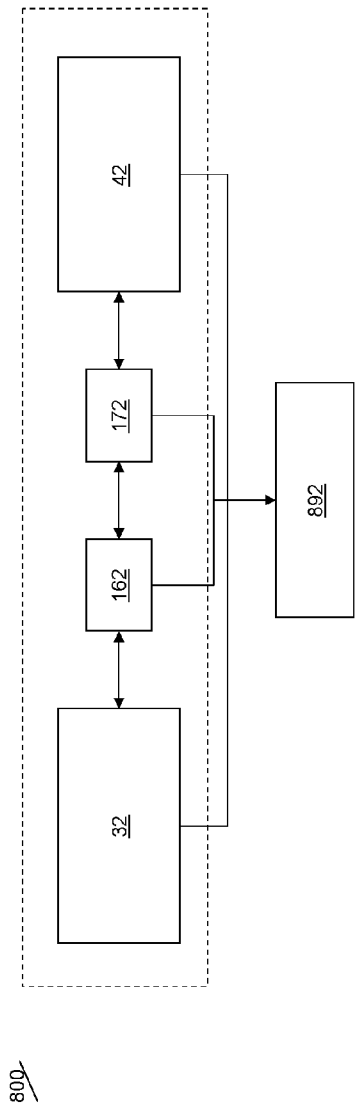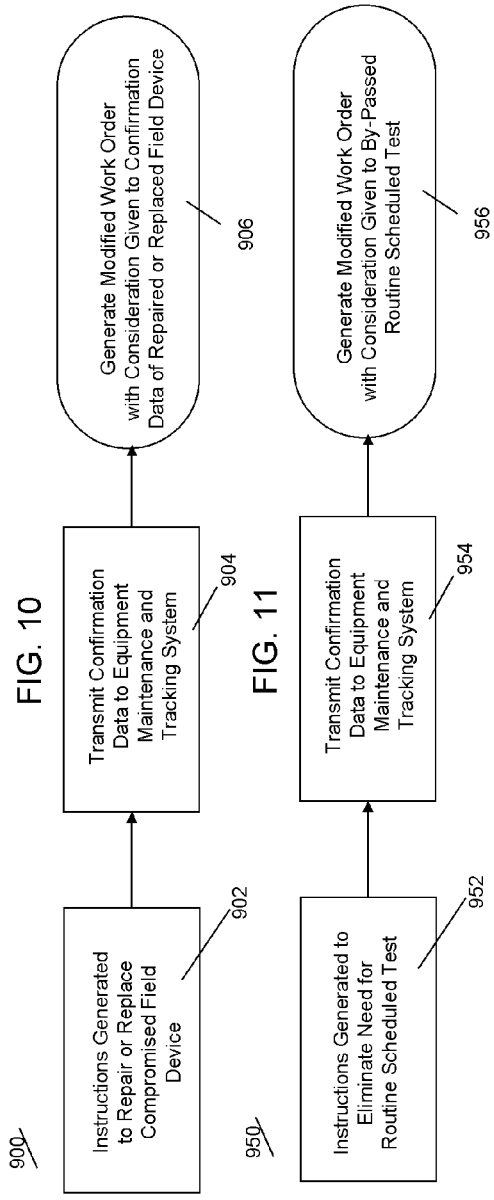

FIG. 12

| Symptoms | Diagnosed Fault | | | |
|---|---|---|---|---|
| | Block Impulse Line (closed isolation valve process connection) | Open Circuit (wiring fault) | Communication Failure | Microprocessor or Sensor Failure |
| Static PV reading | X | | | |
| High Temperature | | | | X |
| Over-range (High) Process Variable measurement | | | | X |
| Under-range (Low) Process Variable measurement | | | | X |
| Loss of Primary Communications | | X | X | |
| Loss of Power | | X | | |

FIG. 13

| Symptoms | Diagnosed Fault | | | |
|---|---|---|---|---|
| | Stuck valve in open position | Broken Actuator Shaft/Coupling to Valve | Leaking O-ring in Actuator power cylinder | Stuck valve in intermediate position |
| Uninitiated valve movement | | | X | |
| Low torque required during Partial Stroke Test | | X | | |
| Valve did not return to fully open position following a Partial Stroke Test | | X | X | X |
| Valve fails to move off of fully open position during PST | X | | | |

INTEGRATED MONITORING, CONTROL AND EQUIPMENT MAINTENANCE AND TRACKING SYSTEM

RELATED APPLICATIONS

The present application is a Divisional of U.S. patent application Ser. No. 13/121,516 now U.S. Pat. No. 8,649,888 B2, filed on 29 Mar. 2011, a national phase application under 35 U.S.C. §371 of PCT/US09/058985 filed on 30 Sep. 2009, which claims the benefit of U.S. Provisional Patent Application No. 61/194,878 filed on 30 Sep. 2008, disclosures of which are all incorporated herein by reference in their entireties.

BACKGROUND OF THE INVENTION

1. Field of the Invention

This invention relates to regulatory control systems and safety shutdown systems and methods for monitoring and controlling field devices used with commercial and industrial processes, and in particular to systems and methods for improved coordination between control and safety systems.

2. Description of Related Art

In designing automated process control systems for commercial and industrial processes such as chemical plants, petrochemical facilities, manufacturing factories, and the like, the conventional practice is to maintain redundant topologies, with a safety shutdown system that is independent from the plant's regulatory control system. This practice is rooted in the belief that keeping two completely separate systems reduces the risk of a single failure disabling all automated process controls. In addition, this isolation is often required by applicable standards.

As used herein, the term "field devices" includes sensors and final control elements. Final control elements include pumps, valves, valve actuators and the like. Sensors include switches and transmitters for monitoring a wide variety of variables, including, but not limited to, valve position, torque, level, temperature, pressure, flow rate, power consumption, and pH. Other terminology that is well known to those of ordinary skill in the art of process instrumentation is also used herein.

As used herein, "commercial and industrial processing facilities" include chemical plants, petrochemical facilities, manufacturing factories, or any facility that uses separate safety system field devices and process control field devices.

Thus, a typical facility of the prior art, as shown in FIG. 1, has a safety system 30 (also known as a "safety shutdown system," "emergency shutdown system", "ESD," "ESS," "safety instrumented system," or "SIS") and a process control system 40 (also known as a "regulatory control system"). The safety system 30 includes an independent computer 32 (also known as a "safety logic solver" or "SLS") in communication with field devices in a plurality of groups $25_1, 25_2, 25_3 \ldots 25_M$ (also known as "safety instrumented functions" or "SIFs") associated with subprocesses operating in the facility. Computer 32 includes a processor, memory and associated computer hardware and software to monitor and control one or more plant subprocesses and to implement the SIFs. The safety system 30 also includes for each of the groups $25_1, 25_2, 25_3 \ldots 25_M$ one or more safety system sensors 36 (e.g., heat sensors "HS" and pressure sensors "PS") and one or more safety system final control elements 38.

The process control system 40 includes a computer 42 (also known as a "distributed control system" or "DCS," or a "basic process control system" or "BPCS") in communication with field devices in a plurality of groups $24_1, 24_2, 24_3 \ldots 24_M$ associated with subprocesses operating in the facility which correlate with the subprocesses having field devices in groups $25_1, 25_2, 25_3 \ldots 25_M$ of the safety system 30. Computer 42 includes a processor, memory and associated computer hardware and software to monitor and control one or more plant subprocesses and to implement the process control functions. The process control system 40 also includes, for each of the groups $24_1, 24_2, 24_3 \ldots 24_M$, one or more process control system sensors 46 (e.g., heat sensors "HS" and pressure sensors "PS"), and one or more process control system final control elements 48. The operating procedures and access passwords are different for the two systems 30 and 40, thereby strengthening separation between them and restricting access to properly trained and authorized personnel.

Conventional design provides for an exchange of information between the central processors of the respective systems, viz, between the safety system computer 32 and the process control system computer 42. For instance, U.S. Pat. No. 6,975,966 and related U.K. Patent Publication GB2445636, assigned to Fisher-Rosemount Systems, Inc. describe a software module that provides a user interface to view various parameters from both a process control system controller and a safety system controller within a plant, with indicators to distinguish whether a signal is from the process control system controller or the safety system controller. Certain alarms can be acted upon from that user interface using the individual functionalities of the discrete process control system controller and a safety system controller.

However, the Fisher-Rosemount system does not contemplate the automatic use of the complementary sensors or final control elements within a safety instrumented function ("SIF") or regulatory control loop when a device is taken out of service or disabled due to an internal fault. That is, no communications capability exists for the 32 SLS to communicate directly with regulatory control devices 46, 48 at the field level, or for a DCS 42 to communicate directly with field devices 36, 38 of the safety shutdown system 30. Rather, redundancy in a safety shutdown system is achieved in prior art systems by installing multiple sensors to measure a particular process parameter, e.g., flow, pressure, level, or temperature, and installing multiple final control elements to isolate the same process line. Redundancy in a regulatory control system is achieved in the same manner. Each of the redundant set of sensors and final control elements communicates independently to the central processor of its respective system, and in the Fisher-Rosemount systems, the separate communications can be viewed and acted upon from the common user interface; however, no coordination exists between the safety system and the control system.

A common prior art approach uses majority logic decision-making processes when a sensor fails within a safety instrumented function. In a majority logic process, a decision is made as to whether a device should trip or remain steady if a predetermined number of devices fail or provide readings outside of the desired range. For instance, a safety instrumented function utilizing three sensors with an emergency shutdown system can be set at "two out of three" logic, so that if two devices fail or read outside of the desired range, the associated device trips. Other levels of decision logic are commonly used, e.g., "one out of one," "one out of two," "one out of three," "one out of four," "two out of two," "two out of three," "two out of four," "three out of three," or the like. The selection of the level of decision logic depends on the criticality of the system, reliability requirements, and the associated risks. Accordingly, for example, in a "two out of three"

decision logic structure, if two out of the three sensors provide a reading that shows that the process is out of range, then the safety instrumented function will initiate a command to trip, i.e., shutdown. Such decision logic based on the remaining sensors will either impact the reliability of the plant or result in unnecessary trips for the plant.

Another common prior art approach in the implementation of safety systems includes use of redundant final elements, such as emergency shutdown valves, to perform a shutdown for a plant or part of a plant. If one or more of the valves within a safety instrumented function are at fault, then the safety instrumented function and safety logic solver can elect to shutdown the associated system with that safety instrumented function through the remaining healthy valves as a precautionary measure.

A further problem in conventional commercial and industrial processes relates to the routine maintenance of the independent systems. Self-diagnostics has previously been limited to collecting information from the physical device as symptoms of a potential problem. Conventional approaches rely on a human and an external software package to diagnose the extent of the problem and to decide whether a device should be removed from service. Equipment maintenance and tracking systems, such as software systems commercially available from SAP AG of Walldorf, Germany, generates work orders for functional testing at predetermined intervals so that every field device is periodically tested. In many cases, the end testing is very time-consuming, requiring manually performed maintenance checks to detect device failures and to alert operations personnel of the disabled state of a device. Furthermore, large-scale plants can have over 10,000 safety-related data points. Accordingly, conventional diagnostic and maintenance methods require substantial human presence in the field or plant environment to perform these routine functional checks and calibrations, thereby increasing the exposure of the human operators to a hazardous environment. This also increases the potential for human error that could damage field devices, leaving them unable to perform their intended function. Manual functional testing may only be performed quarterly, semiannually, or annually, resulting in outages that can remain undetected for upwards of several months.

Furthermore, the equipment maintenance and tracking systems of the prior art are typically managed independently from other systems such as the safety system 30 and the process control system 40. Accordingly, if an operation other than the work order-prescribed functional testing requires a field device to be tested, repaired or replaced, this information is not considered in the conventional equipment maintenance and tracking systems.

Therefore, a need exists for improved efficiencies in commercial and industrial processes, while still maintaining excellent reliability and separation of functionality including process control systems and safety systems.

Accordingly, it is an object of the present invention to maintain redundant topologies between a safety system and a process control system, while providing a system, apparatus and methods for increased and improved coordination between an emergency shutdown system and a process control system in the event of failure of one or more related field devices.

It is another object of the present invention to incorporate enhanced diagnostics capabilities into such systems.

It is further object of the present invention to provide means to achieve efficiencies in the management of what is often a vast number of field devices in a typical commercial and industrial processing facilities.

SUMMARY OF THE INVENTION

The above objects and further advantages are provided by the systems and methods of the invention for improved coordination between control and safety systems of commercial and industrial processing facilities.

According to one aspect of the present invention a system and method are provided for monitoring and control of a plurality of field devices separately provided in a safety subsystem and a process control subsystem. The field devices include conventional safety subsystem field devices associated with one or more processes or subprocesses and conventional process control subsystem field devices associated with one or more of the processes or subprocesses. The integrated and coordinated system used complementary field device data including mappings of safety subsystem field devices and process control subsystem field devices corresponding to the same process or subprocess. Signals are received from a compromised field device, and its function or functions are delegated to its complementary field device as indicated by the complementary field device data.

According to further aspects of the present invention, integrated monitoring, control and equipment maintenance and tracking systems and methods are provided for managing a plurality of field devices. The integrated and coordinated system includes a monitoring and control system that uses safety subsystem field device data and process control subsystem field device data. When a compromised field device is determined, e.g., by the safety system and/or the process control system, information about testing, maintenance, repair or replacement is conveyed to the monitoring and control system. In one aspect of the present invention, this information is used to modify the work orders created by an equipment maintenance and tracking system such that the compromised field device, or a field device at a location of the compromised field device, is not subject to unnecessary or excessively redundant testing. In another aspect of the present invention, this information is used to modify a field device routine maintenance schedule created by an equipment maintenance and tracking system, including routine maintenance for the compromised field device, or a field device at a location of the compromised field device. The modification is based on instructions generated by the instruction generating module of the monitoring and control system processor, such that a field device is not subject to unnecessary or excessively redundant testing.

BRIEF DESCRIPTION OF THE DRAWINGS

The invention will be described in further detail below and with reference to the attached drawings in which the same or similar elements are referred to by the same or similar reference numerals, in which:

FIG. 8 is a process flow diagram of steps carried out to maintain high safety levels using the system and method of the present invention;

FIG. 9 is a block diagram of an equipment maintenance and tracking system integrated with the composite process control and safety system according to the present invention;

FIG. 10 is a process flow diagram for one aspect of improved equipment maintenance and tracking according to the present invention;

FIG. 11 is a process flow diagram for another aspect of improved equipment maintenance and tracking according to the present invention;

FIG. 12 is a table illustrating a symptom/diagnostic matrix for a sensor interface; and FIG. 13 is a table illustrating a symptom/diagnostic matrix for a final control element interface.

DETAILED DESCRIPTION OF THE INVENTION

Figure 1:
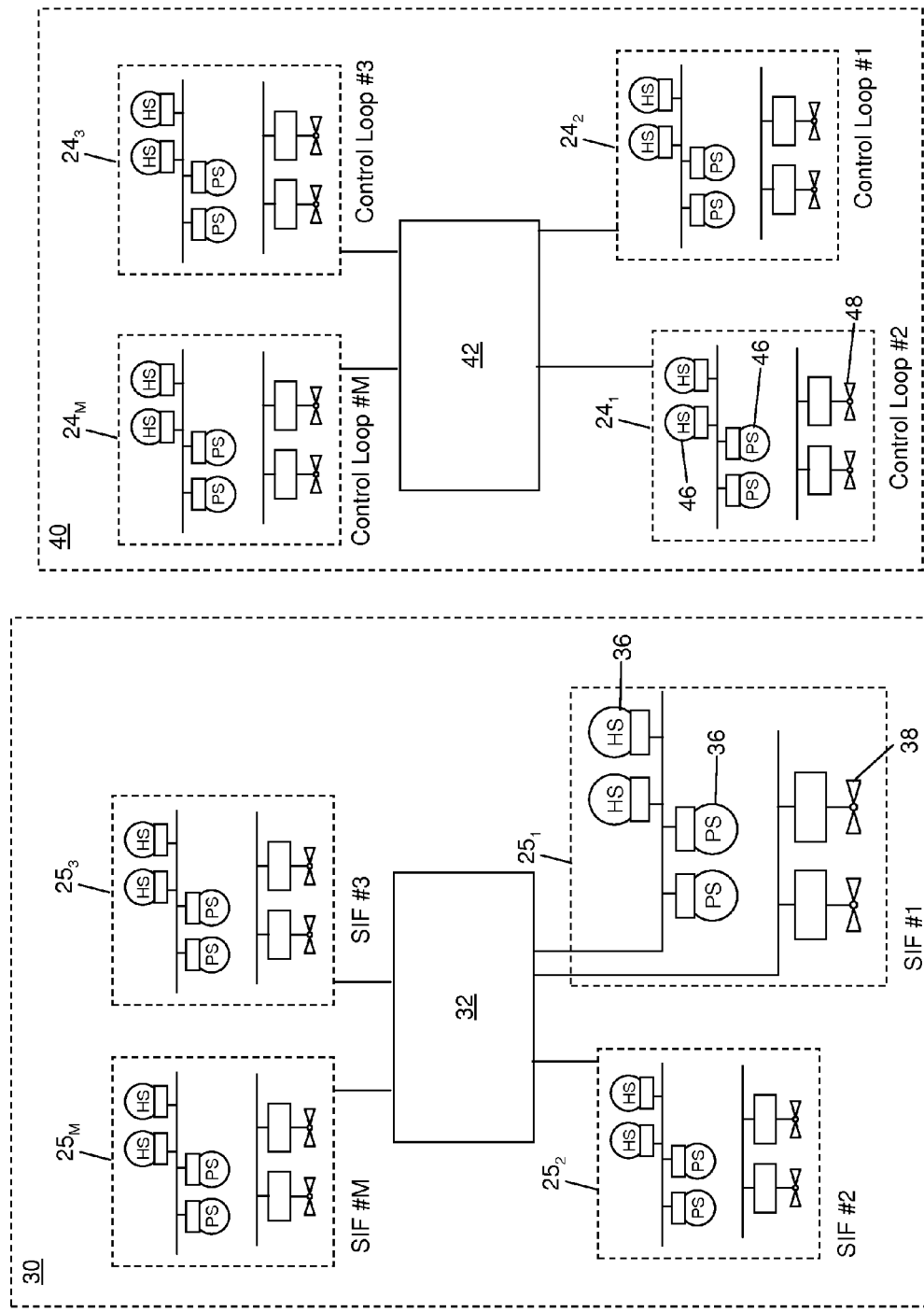
FIG. 1 is a schematic diagram of the process architecture representing the prior art.

The present invention broadly comprehends a composite regulatory control and safety shutdown system for commercial and industrial processing facilities. During conditions in which the automated process control field devices are functioning properly, the composite regulatory control and safety shutdown system operate as two independent systems, with redundant topologies that provide for high reliability. In the event of a fault condition or maintenance operation that removes a field device from service, the system and method of the present invention detects the condition or operation in real time, and utilizes complementary field devices so that the plant is not exposed to increased safety risk or degraded process control.

The regulatory control system of the present invention includes the conventional arrangement of control loops including process measurement devices such as sensors; final control elements such as pumps, control valves, solenoid valves, and the like; and a control processor ("DCS"). In addition, the system of the present invention includes one or more advanced diagnostic and control modules ("ADCM"), one or more interactive sensor diagnostic monitors ("ISDM"), and an intelligent safety and control integrator (ISCI-C).

Similarly, the safety shutdown system of the present invention includes the conventional arrangement of safety instrumented functions including process measurement devices, final control elements and a control processor ("SLS"). In addition, the system of the present invention includes one or more ADCMs, one or more ISDMs, and an intelligent safety and control integrator ("ISCI-S").

In one embodiment of the present invention, the ISCI-C interfaces with the DCS, and the ISCI-S interfaces with the SLS. The ISCI-C includes a memory in which is stored a topological map of the field devices, including regulatory control sensors and final control elements. For each of those field devices, the ISCI-C also includes a mapping of a complementary device in the safety shutdown system. Likewise, the ISCI-S includes a memory in which is stored a topological map of the field devices, and a mapping of the complementary devices in the regulatory control system.

An ADCM interfaces with a final control element, and an ISDM interfaces with a sensor. Each field device interface (ADCM or ISDM) has on-board computational capabilities, e.g., an integrated circuit, that includes a processor operably connected to an associated memory device having the capability to store key diagnostics and to diagnose faults or conditions that would impair the device from performing its intended function. Each field device interface also includes the required communications interface hardware and software to communicate with the primary controller (SLS or DCS), neighboring devices within a safety instrumented function or process control loop, and with the ISCI.

Thus, the invention maintains the conventional communications path between each field device and the primary controller, safety logic solver or basic process control system, while including additional communications pathways from the ISDM or ADCM to the associated ISCI and from the ISDM or ADCM to the associated field device and to neighboring field devices, which enhance the provided coordination functionality.

Certain aspects of the present invention can be implemented using a wireless system such as the SP100 wireless standard, as defined by the International Society of Automation Wireless Systems for Automation Standards Committee, though as will be apparent to those of ordinary skill in the art, other standards, such as ZIGBEE™, Wireless LAN (including IEEE 802.11), Wireless PAN (including IEEE 802.15), Wireless Hart, are also suitable and can be utilized. Further aspects of the present invention are implemented using a hardwired network such as the Fieldbus Foundation for Safety Instrumented Functions ("FF-SIS") standard, though other suitable standards exist and can be deployed.

The system and method of the present invention assures that the requisite safety function is maintained using existing logic within the SLS, while simultaneously addressing the practical reality that safety devices are routinely taken out of service or unexpectedly disabled due to required maintenance or failures caused by faults that occur within the field devices. In addition, the system and method of the present invention maintains the "best practice" of complete separation of the safety function and the control function under normal conditions, while leveraging the use of complementary sensors and final control elements to achieve improved reliability, availability and coordination in system performance, including production operations and emergency shutdown operations.

The system and method of the present invention also provides improved diagnostic capabilities that go beyond the collection of symptoms available in prior art systems and methods, allowing the field interface unit to diagnose the problem and apply the logic protocol of the system to decide, at the device level, whether the intended function is to be executed. The diagnostic test is conducted continuously, and if the field device is deemed to be "out of service," this status is communicated in real time to the associated ISCI and the neighboring field devices. This provides a significant advantage over the prior art, which typically requires a human operator to physically visit each device to diagnose when a device has failed, or to use a separate diagnostic software system to scan and evaluate the health of the device. The system and method of the present invention thus reduces the risk of dangerous faults remaining undetected for extended periods of time, reduces the exposure of plant personnel to hazardous field conditions, and reduces the risk of human error that could cause unintentional disablement of field devices.

The system and method of the present invention further provides for efficient operation of equipment maintenance and tracking systems by integrating information related to testing, repairs and/or replacement of field devices initiated by the safety system or the process control system, thereby reducing the workload during the work order generated functional testing.

Reference will now be made in detail to implementations of the invention, examples of which are illustrated in the accompanying drawings.

As described above in the Description of the Related Art, FIG. 1 shows a topology of a conventional process control system 40 and safety system 30 for oil and gas processing facilities. The process control system 40 has a computer 42, e.g., a DCS controller that controls and oversees control loop groups $24_1, 24_2, 24_3 \ldots 24_M$ with control loops having sensors 46 and final control elements 48. The safety shutdown system 30 has a computer 32, e.g., an SLS controller, that controls and oversees SIF groups $25_1, 25_2, 25_3 \ldots 25_M$ having sensors 36 and final control elements 38. According to the conventional approach, there is minimal communication between the two systems 30 and 40, and they operate as independent systems for safety functions and control functions, respectively.

Figure 2:
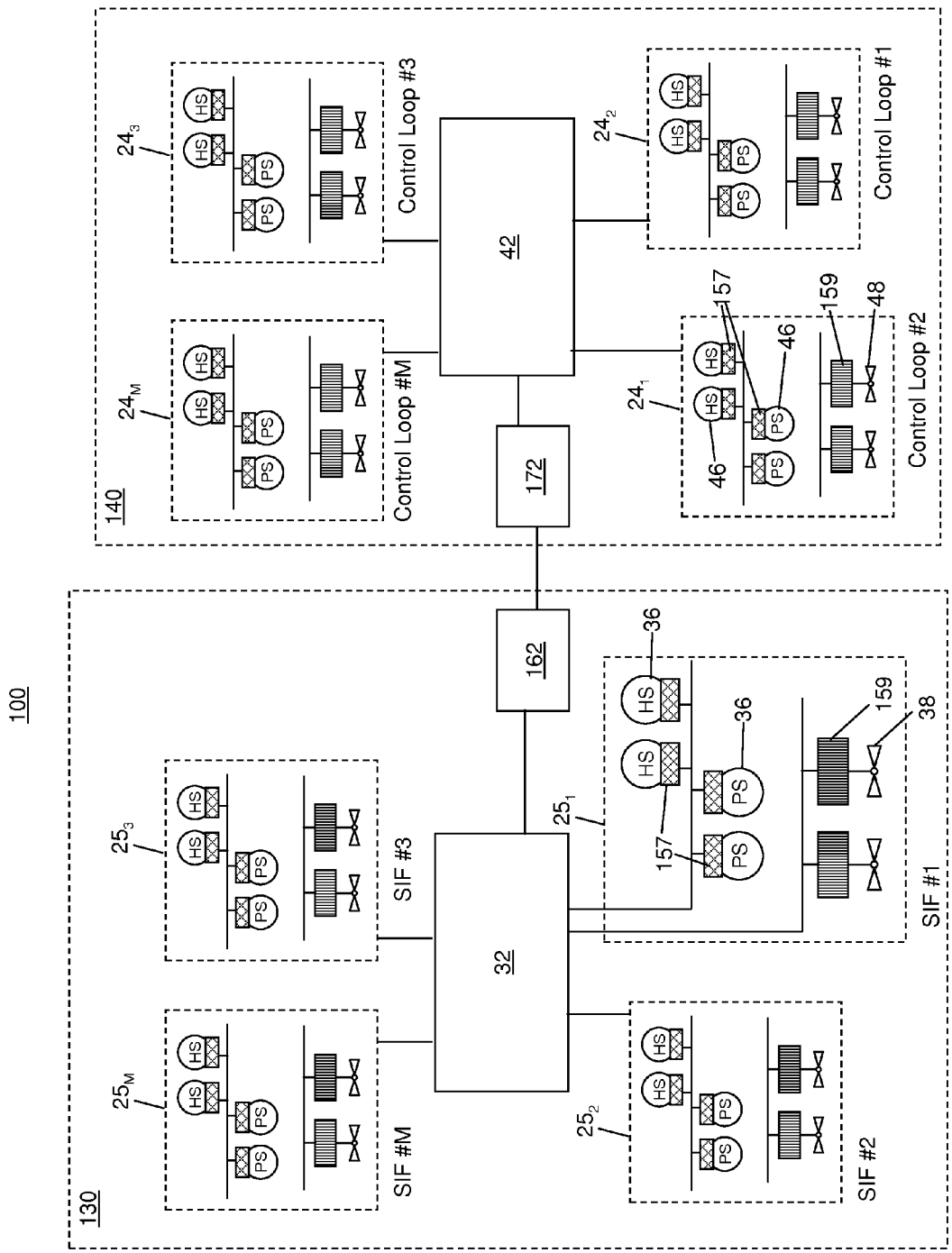
FIG. 2 is a schematic diagram of the process architecture of the composite process control and safety system of the present invention.

According to the present invention, as illustrated in FIG. 2, a composite regulatory control and safety shutdown system 100 is provided that includes redundant topologies between a safety system and a process control system, while allowing for coordination and enhanced communications and between the two systems in the event of failure of a field device. When the automated process control field devices are functioning properly, the safety shutdown subsystem 130 and regulatory control subsystem 140 function as two independent systems, with redundant topologies that provide for high reliability.

Figure 4:
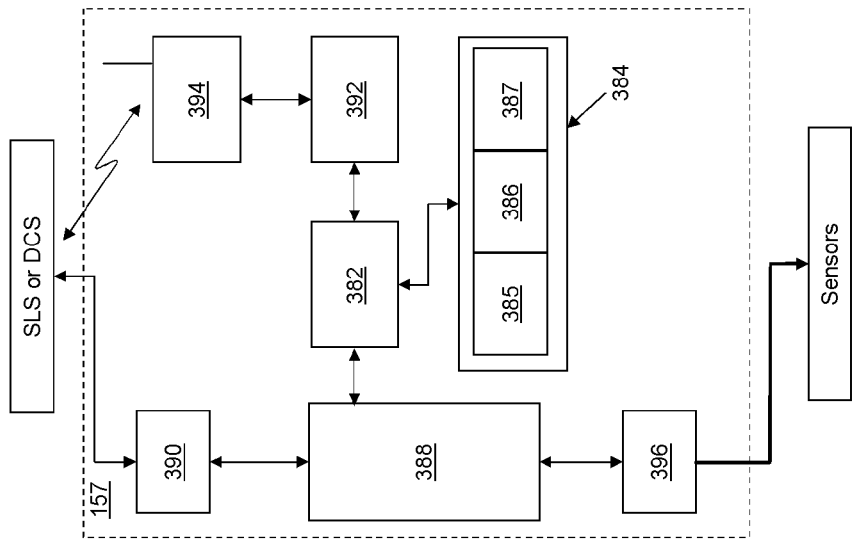
FIG. 4 is a block diagram of an interactive sensor diagnostic monitor incorporated in the composite regulatory control and safety shutdown system of the present invention.
Figure 3:
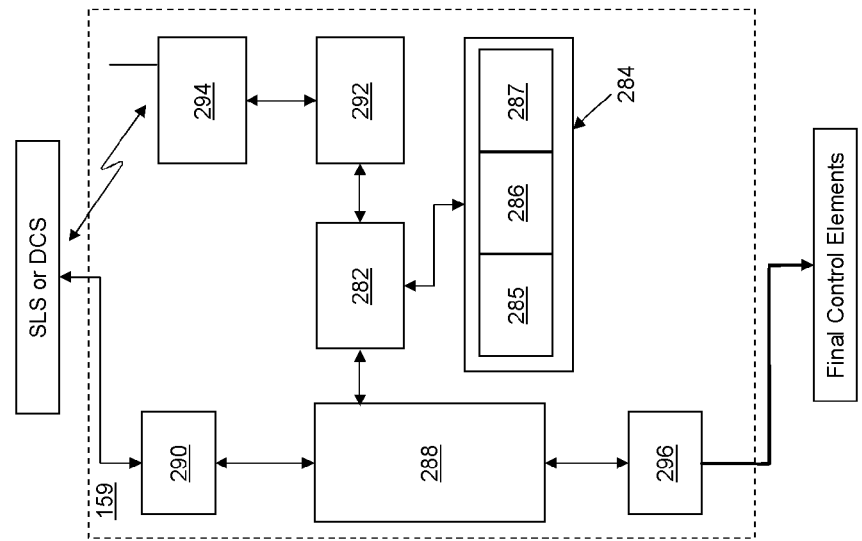
FIG. 3 is a block diagram of an advanced diagnostic and control module incorporated in the composite regulatory control and safety shutdown system of the present invention.
Figure 6:
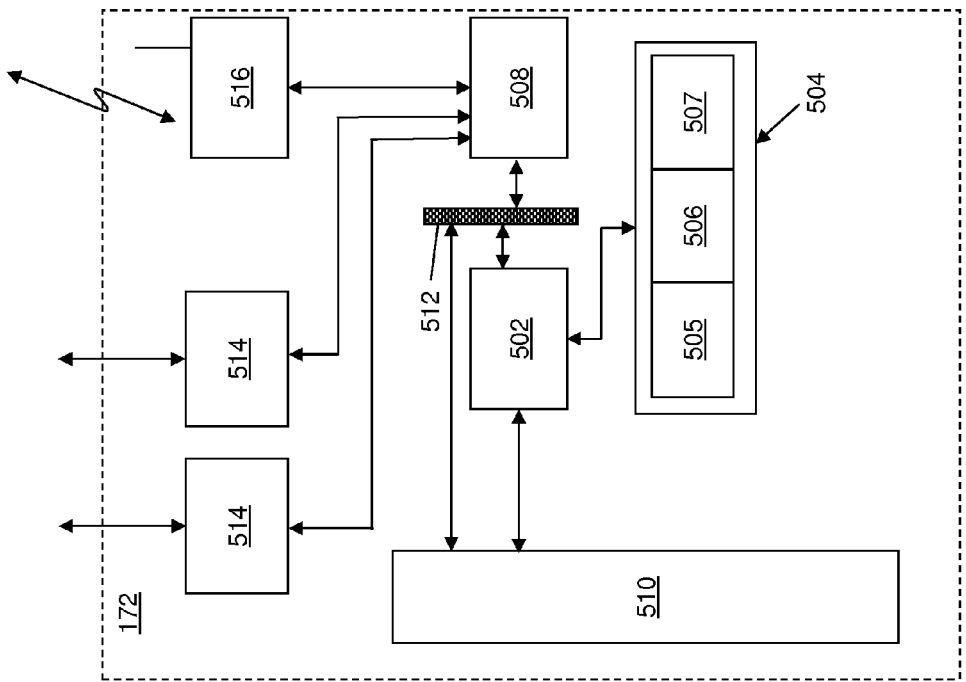
FIG. 6 is a block diagram of an intelligent safety and control integrator associated with the regulatory control system incorporated in the composite regulatory control and safety shutdown system of the present invention.
Figure 5:
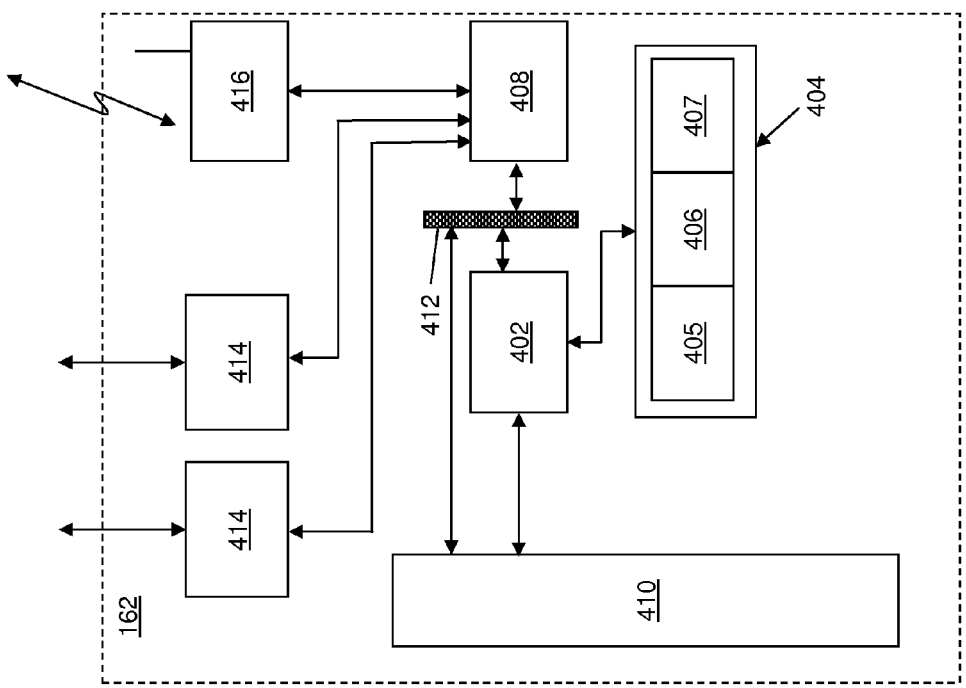
FIG. 5 is a block diagram of an intelligent safety and control integrator associated with the safety shutdown system and incorporated in the composite regulatory control and safety shutdown system of the present invention.

The system 100 includes: (a) ADCM field interface units 159 at the final control elements 38, 48, (b) the ISDM field interface units 157 at the sensors 36, 46, and (c) the Intelligent Safety and Control Integrators ("ISCI") 162, 172 incorporating a user-configurable overlay of safety-related cause-and-effect diagrams and the process control sensors and final control elements used in the same service. FIGS. 3 and 4 show embodiments of an ADCM field interface unit 159 and an ISDM field interface unit 157, respectively. Furthermore, FIGS. 5 and 6 show the ISCI-S and ISCI-C, respectively.

According to the present invention, individual field devices or groups of field devices in the control loop groups $24_1, 24_2, 24_3 \ldots 24_M$ are mapped to complementary field devices or groups of field devices, i.e., that provide sensing or control element functionality to associated plant equipment in the SIF groups $25_1, 25_2, 25_3 \ldots 25_M$. Likewise, individual field devices or groups of field devices in the SIF groups $25_1, 25_2, 25_3 \ldots 25_M$ are mapped to complementary field devices or groups of field devices in the control loop groups $24_1, 24_2, 24_3 \ldots 24_M$. The mapping of the complementary field devices constitutes complementary field device data which is stored in the memory of one or more computers that perform monitoring and control functions in accordance with the present invention. In addition, as further detailed herein, one or more processors of the computers in the system 100, or in a computer that carries out some or all of the monitoring and control functions of the computers in the system 100, include a coordination module which receives a signal from a compromised field device and delegates the function or functions of that compromised field device to its complementary field device as indicated by the complementary field device data. Thus, in the event of a fault condition or maintenance operation that removes a field device from service, the present invention detects the condition or operation in real time and coordinates the safety system and the control system such that appropriate function(s) are assigned to complementary field devices so that the plant is not exposed to increased risk and/or degraded control.

In one embodiment, a preferred hardwired network is the FF-SIS, and a preferred wireless network is based on the SP100 standard, which is intended for use in the 2.4 GHz band, and allows data to be transferred at speeds of up to 250 kbps within about 100 to about 400 meters.

FIG. 3 is a block diagram of an ADCM field interface unit 159 used in conjunction with final control elements 38, 48 and that is incorporated in the composite regulatory control and safety shutdown system 100 (illustrated in FIG. 2). ADCM field interface unit 159 includes a processor 282, such as a central processing unit, associated with a memory 284. Memory 284 commonly includes both volatile (RAM) and non-volatile (ROM) memory units, and stores software or firmware programs in a program storage portion and stores data in a data storage portion. In particular, data stored in the system of the present invention can includes information 285 related to the associated field device such as the type of device, device identification, date placed in service, operating parameters such as requisite valve force for stroking, and the like; information 286 related to the complementary field device, such as complementary device identification; and information 287 including user configurable data. User configurable data stored as information 287 in memory 284 of the ADCM field interface unit 159 includes, but is not limited to, constraints and limits related to device specific performance that will define when a device enters a degraded condition, i.e., a fault detected state. For example, a user defined time limit parameter can be provided that defines an acceptable delay when an emergency isolation valve is commanded to move from the normal operating position. The user defines this parameter for each valve based on the expected normal valve hysteresis such that sufficient time is provided for normal lags in valve response, while limiting the time that a valve is provided to move before deeming it in a "stuck" position and thus not available to respond to a safety command.

The processor 282 interfaces with a multiplexer 288 enabling signals from hundreds or thousands of interface units to share a network. The ADCM field interface unit 159 communicates with one or more of the SLS, DCS, ISCI-S and/or ISCI-C through a network interface 290. In addition, a data routing and protocol translation module 292 and wireless interface 294 allow the ADCM field interface unit 159 to communicate with one or more of the SLS, DCS, ISCI-S and/or ISCI-C through a wireless communication system. Communications from the ADCM field interface units 159 and one or more of the SLS, DCS, ISCI-S and/or ISCI-C include the status of the associated final control element 38 or 48, e.g., whether a valve is open or closed or whether a fault is detected. In addition, communications from the SLS, DCS, ISCI-S and/or ISCI-C to the ADCM field interface units 159 include information related to a complementary field device, control command instructions and programming instructions.

The ADCM field interface unit 159 also includes an interface 296 for communication with final control elements 38, 48, with the ability to relay control command (e.g., send OPEN and CLOSE demands) and the ability to receive feedback (e.g., VALVE OPENED or VALVE CLOSED). Suitable devices that perform some of the functionalities of the ADCM field interface unit 159 and its associated final control element 38 or 48 include those commercially available from Emerson Process Management-Fisher of Marshalltown, Iowa, USA under the trade name FIELDVUE™ and incorporated with emergency shutdown valves. The combination of a valve and IC device is also referred to in the art as a "SMART ZV" ("SMART ZV") by the applicant herein. With the coordination capabilities of the system and method of the present invention, additional functionalities are also provided, that are not available on prior art systems incorporating emergency shutdown valves. In particular, using the ADCM field interface unit 159 of the system and method of the present invention, the final control elements are capable of executing commands from any or all of the control system, the safety system and a vibrational management system (described further herein).

FIG. 4 is a block diagram of an ISDM field interface unit 157 used in conjunction with sensors 36, 46 and incorporated in the composite regulatory control and safety shutdown system 100 (illustrated in FIG. 2) and includes a processor 382 associated with a memory 384. Memory 384 commonly includes both volatile (RAM) and non-volatile (ROM) memory units, and stores software or firmware programs in a program storage portion and stores data in a data storage portion. In particular, data stored in the system of the present invention includes information 385 related to the associated field device such as the type of device, device identification, date placed in service, operating parameters such as requisite valve force for stroking, and the like; information 386 related to the complementary field device, such as complementary device identification; and information 387 including user configurable data. User configurable data stored as information 387 in memory 384 of the ISDM field interface unit 157 includes, but is not limited to, constraints and limits for device specific performance that defines when a device enters a degraded condition, i.e., a fault detected state. For example, a user defined time limit parameter can be provided that defines an acceptable delay when a process variable does not change. The user defines the time and the allowable amount of change in one or more variables to determine when a sensor is in a "stuck" condition and no longer responds to process changes.

The processor 382 interfaces with a multiplexer 388 enabling signals from hundreds or thousands of interface units to share a network. The ISDM field interface unit 157 interfaces one or more of the SLS, DCS, ISCI-S and/or ISCI-C through a network interface 390. In addition, a data routing and protocol translation module 392 and wireless interface 394 allow the ISDM field interface unit 157 to communicate with one or more of the SLS, DCS, ISCI-S and/or ISCI-C through a wireless communication system. The ISDM field interface unit 157 also includes an interface 396 for communication with sensors 36, 46, with the ability to receive sensor information.

The ADCM and ISDM field interface units can be implemented as cards mounted in the same enclosure with the field devices, or as stand-alone enclosures. If the ADCM and/or ISDM interface units are provided in separate enclosures, they can include hardwire connections to the associated field devices carrying a discrete signal or a 4-20 mA analog signal.

The ADCM field interface unit can operate in a number of modes. In a "Safety-Disabled" mode, neither the final control element nor the ADCM field interface unit is operational. In a "Safety-Basic Operation" mode, the signal from the control processor (the SLS for a safety shutdown system ADCM field interface unit or the DCS for a regulatory control system ADCM field interface unit) is passed through the multiplexer without alteration. In a "Safety-Enhanced" mode, the ADCM field interface unit operates based on input from the control processor and signal and logic commands received from the ISCI. In a "Safety-Control Integration" mode, the ADCM field interface unit operates based on input from the control processor and signal and logic commands received from the ISCI, and diagnosis input from the complementary final control element. In this mode, the complementary final control element is used as a potential backup for the primary final control element. In a "Safety-Test" mode, the ADCM field interface unit and/or its associated final control element undergoes routine planned maintenance testing. The inputs to the ADCM field interface unit from the hardwired network are received first at the multiplexer, which, depending on the mode of operation, passes the signal to the final control element under normal operation, halts the signal, or signals the final control element to trip.

FIGS. 5 and 6 are block diagrams of the ISCI-S and ISCI-C, respectively. The ISCI units according to the present invention have various functions, including but not limited to:

a. interfacing with the SLS and the DCS;

b. providing communications with the ADCM and ISDM interface units and through them to the sensors and final control elements;

c. providing a user interface to configure the overlay of safety system cause-and-effect relationship with complementary process control related devices; and d. regulating the predetermined fall-back strategy or protocol upon detected failures of field devices.

In particular, and referring to FIG. 5, an embodiment of an ISCI-S 162 is schematically illustrated. ISCI-S includes a processor 402 associated with a memory 404. Memory 404 commonly includes both volatile (RAM) and non-volatile (ROM) memory units, and stores software or firmware programs in a program storage portion and stores data in a data storage portion. In particular, data stored in the system of the present invention includes information 405 related to the emergency shutdown ("ESD") management system, information 406 related to the DCS data, i.e., required to identify the complementary devices from the process control system, and information 407 including user configurable data. Processor 402, a data routing and protocol translation module 408 and an adaptive process safety simulator ("APSS") 410 are interfaced via a bus 412. In certain embodiments, the protocol translation module 408 and/or the APSS 410 can be implemented as separate hardware devices incorporating separate processors and memory devices (not shown) having the appropriate software and/or firmware programmed therein. In other embodiments, the protocol translation module 408 and/or the APSS 410 can be implemented in program storage of memory 404 as software and/or firmware modules. Accordingly, if implemented as software modules, the bus connections can be eliminated.

Data routing and protocol translation module 408 allows the ISCI-S 162 to communicate with the SLS 32, the ISCI-C 172, and ISDM and ADCM interface units 157, 159, respectively, using, for instance, wired interfaces 414 and/or a wireless interface 416. APSS 410 complements the safety logic provided by the SLS 32 in that the SLS 32 typically makes decisions based on a static view of the process conditions and the APSS 410 addresses the dynamics of the process over time due to changes in plant capacity, rate of production, newly introduced technology, and the like, which can impact the process and subsequently change the operating ranges and safety thresholds. The APSS 410 includes one or more software modules that generate real-time predictions of the process states, dynamics, and the requisite safety actions. The APSS 410 adapts to these changes and updates the operating ranges and safety threshold parameters at the ISDM and ADCM interface units 157, 159, respectively.

In the event that the SLS 32 is out-of-service, the ISCI-S 162 can serve as a backup. If communications are interrupted between the SLS 32 and the associated ISDM interface units 157 and ADCM interface units 159, the ISDM and ADCM interface units 157, 159, respectively, will query the to the ISCI-S 162 for instructions regarding whether to trip or to fail steady in the event of certain conditions.

The ISCI-S 162 maintains a list of all ADCMs and ISDMs and tracks their condition, e.g., whether they are in service or disabled. In accordance with the system and method of the present invention, if an ADCM/ISDM and/or its field device is out of service, the ISCI-S 162 will initiate an alert and communicate to the ISCI-C 172 to prevent the out-of-service device's complementary device from being removed from service, e.g., for routine maintenance.

Referring now to FIG. 6, the ISCI-C 172 is similar in structure as the ISCI-S 162, and includes a processor 502 associated with a memory 504. Memory 504 commonly includes both volatile (RAM) and non-volatile (ROM) memory units, and stores software or firmware programs in a program storage portion and stores data in a data storage portion. In particular, data stored in the system of the present invention includes: information 505 related to the regulatory control system operations; information 506 related to complementary data from the safety system; and information 507 including user configurable data. Processor 502, data routing and protocol translation module 508 and an adaptive process control simulator 510 are interfaced via a bus 512. Data routing and protocol translation module 508 allows the ISCI-C 172 to communicate with the DCS 42, the ISCI-S 162, and ISDM and ADCM interface units 157, 159, respectively, using, for instance, wired interfaces 514 and/or a wireless interface 516. Note that, as discussed above with respect to FIG. 5, protocol translation module 508 and/or adaptive process control simulator 510 can be implemented as separate hardware or software modules. Accordingly, if implemented as software modules, the bus connections can be eliminated.

Data routing and protocol translation module 508 allows the ISCI-C 172 to communicate with the DCS 42, the ISCI-S 162, and ISDM and ADCM interface units. The APCS 510 complements the safety logic provided by the DCS 42, in that the DCS 42 typically makes decisions based on a "static" view of the process conditions, and the APCS 510 addresses the dynamics of the process over time due to changes in plant capacity, rate of production, newly introduced technology, and the like, which can impact the process and subsequently change the operating ranges and safety thresholds. The APCS 510 includes one or more software modules that generate real-time predictions as to the process states, dynamics, and the required safety actions. The APCS 510 adapts to these changes and updates the operating ranges and safety threshold parameters at the ISDM and ADCM interface units 157, 159, respectively.

In the event that the DCS 42 is out-of-service, the ISCI-C 172 can serve as a backup. If communications are interrupted between the DCS 42 and the associated ISDM interface units 157 and ADCM interface units 159, the ISDM and ADCM interface units 157, 159, respectively, will query the to the ISCI-S 162 for instructions regarding whether to trip or to fail steady in the event of certain specified conditions.

The ISCI-C 172 maintains a list of all ADCMs and ISDMs and tracks their condition, e.g., whether they are in service or disabled. If an ADCM/ISDM and/or its field device is out of service, the ISCI-C 172 will initiate an alert and communicate to the ISCI-S to prevent the out-of-service device's complementary device from being removed from service, e.g., for scheduled maintenance.

If an SIF group 25 or control loop group 24 uses a multiple sensor configuration, the ISCI-S 162 or ISCI-C 172 is suitably programmed to initiate an alert and perform user-defined action if one of the sensors provides a reading outside the expected range that has been stored in memory.

A higher level interface or "coordinator" function is also provided by the ISCIs, which provide two-way communications with the field devices and also communicate with the existing SLS 32 and DCS 42. The ISCI-S 162 or both ISCIs 162, 172 contain mappings that overlay SLS cause-and-effects diagram for each SIF and relate each SIF sensor and field device with the complementary field device used within regulatory control loops. This allows critical safety devices within an SIF group to detect a dangerous failure or out-of-service state in real time and communicate the disabled state to the ISCI, relate to the process control field device in the same subprocess, check the status of the regulatory device, and if available, use the process control device to respond to a safety demand should it be initiated by the SLS 32. In a similar fashion, the DCS can use the process data collected by a safety-related sensor or interrupt the flow of product through a flowline or process piping using a safety-related emergency isolation valve.

According to the system and method present invention, through the coordination function between the ISCI-S 162 and the ISCI-C 172, efficiencies and improvements can be realized with respect to systems or sub-systems using majority decision logic. In particular, the reading of the complementary sensor of the process control system 40 are used to replace a reading of a failed sensor in the emergency shutdown system 30. Accordingly, the decision logic is maintained at the original level. For example, if a decision logic is set at "two out of three," in prior art systems, as discussed above in the Background of the Invention, a failed sensor in an emergency shutdown system will effectively reduce the decision logic to "one out of two." However, according to the present invention, and due to the efficacy of the coordination function between ISCI-S 162 and ISCI-C 172, a failed emergency system sensor is immediately replaced by a complementary sensor in the process control system, and the decision logic is maintained at "two out of three."

In another embodiment of the system and method of the present invention, if the control system contains, for instance, three complementary sensors for the associated safety instrumented function, when a sensor fails in the safety instrumented function, the average reading of the three control system sensors can be used to replace the reading of the failed safety instrumented function reading. Accordingly, enhanced reliability is provided to the emergency shutdown decision.

In yet another embodiment of the system and method of the present invention, the safety instrumented function can use the reading of the control system sensor that is nearest in physical to the failed safety instrumented function sensor as a replacement. This can be achieve through the established mapping in the ISCI-S and/or the ISCI-C.

In still another embodiment of the system and method of the present invention, the safety instrumented function can use the reading of the control system sensor that has the highest accuracy to replace the failed safety instrumented function sensor. This can be achieved through the maintenance history log and/or calibration data.

In a further embodiment of the system and method of the present invention, the safety instrumented function can transition to another decision logic protocol. For example, safety instrumented function can transition to decision logic "two out of five" by using the two sensors of the safety instrumented function and the three sensors of the control system. A similar approach can be used for various decision logics for the emergency shutdown system. In similar manner, the control system can use the emergency shutdown system sensors for various control strategies and decisions.

The various alternatives using the decision logic and coordination between the safety instrumented function and the control system according to the present invention can be stored, e.g., as user configured data, in memory of one or more of the ISCI-S, the ISCI-C, the ADCM and/or the ISDM.

In addition, through the coordination function between the ISCI-S 162 and the ISCI-C 172, efficiencies and improvements can be realized with respect to systems or sub-systems using redundancy of final element implementation. For example, if one or more of the valves within a safety instrumented function are at fault, then the safety instrumented function and safety logic solver can elect to take control, or utilize the complementary control system valve(s) in the event of a viable demand to perform a shutdown within that particular safety instrumented function. To achieve this, the ISCI-S sends instructions and notification to the ISCI-C and the control system that the emergency shutdown will be using the associated control system valves for a particular safety instrumented function for the purpose of emergency shutdown, and that the emergency shutdown command, e.g., generated by the ISCI-S, takes priority over basic process control commands. Similarly the control system can use the emergency shutdown system final elements to avoid interruption of the process and production without impacting the emergency shutdown system operation. Note that the general rule is that emergency shutdown commands and conditions take higher priority than control system commands, and the control system should not impact the integrity of the emergency shutdown system in place.

It is comprehended by the system and method of the present invention that a field device can have multiple roles, for example, one role predetermined by the control system and another role predetermined by the safety system. The coordination function of the ISCI-S, ISCI-C, ADCM and/or the ISDM described herein ensures that the priority and role of each final element is in accordance with the status and/or conditions of the safety system or the control system. These multiple roles are executed while ensuring priority of the safety system in favor of the control system. For example, for a final control element such as a shutdown valve, the coordination function of the ISCI-S, ISCI-C and ADCM ensures this priority in situations in which the ADCM receives one or more commands from each of the safety system and the control system, e.g., through the ISCI-S and the ISCI-C, respectively. The ADCM prioritizes these commands in a manner to allow the final control element to execute the role determined by the safety system.

In addition to communicating with the primary controller (SLS or BPCS) and the ISCI devices, each ADCM or ISDM communicates with neighboring devices within a common SIF group or control loop group, via communications methods known to one of ordinary skill in the art. The method and system of the present invention provides a distributed mapping function that utilizes user input to the ISCI to develop the overall SIF and BPCS overlay and to use the field-mounted ISDM memory and processor to retain the individual SIF and control loop overlay should the primary ISCI stop functioning. By operating in this manner, the individual ADCMs and ISDMs provide a back-up for the ISCI to provide the device monitoring and diagnostic function and the execution of the safety or control function should the primary ISDM fail. This allows the SLS and DCS to maintain their operational separation, while providing utilization of complementary field devices to automatically maintain safety and process control functions when field devices are disabled due to faults or maintenance activities.

The system and method of the present invention can also be coordinated with other plant systems, such as vibration monitoring. The vibrations monitoring system can include an intelligent safety and control integrator, e.g., ISCI-V, that communicates with ISCI-S and ISCI-C. In prior art systems, a vibrations monitoring system sends a discrete signal to the emergency shutdown system to shutdown emergency shutdown system valves when vibration exceeds certain a level. The benefit of the present invention with additional coordination between the vibrations monitoring system, the control system and the safety system include: (a) limiting the size or scope of the shutdown due to vibration by using both safety system and process control valves, e.g., since both the process control and safety system valves can be used, valves can be selected that will result in the minimum size or scope of a plant shutdown when vibrations exceed the allowable levels; (b) the emergency shutdown system includes greater access to information about the vibrations monitoring system to allow a proactive approach to faults, e.g., the emergency shutdown system an be prepared earlier and can factor in small levels of vibration or trends in vibration fluctuations rather than depending on a discrete signal to trip or not to trip.

In certain embodiments, the ISCI-C and ISCI-S can be independent units, or combined into a single unit, which is in communication with the SLS and DCS. In additional embodiments, the ISCI-S can be combined with the SLS, and the ISCI-C can be combined with the DCS. In still further embodiments, the ISCI-S, SLS, ISCI-C and DCS can be integrated into a single computer system, for instance, as described below with respect to FIG. 7.

Figure 7:
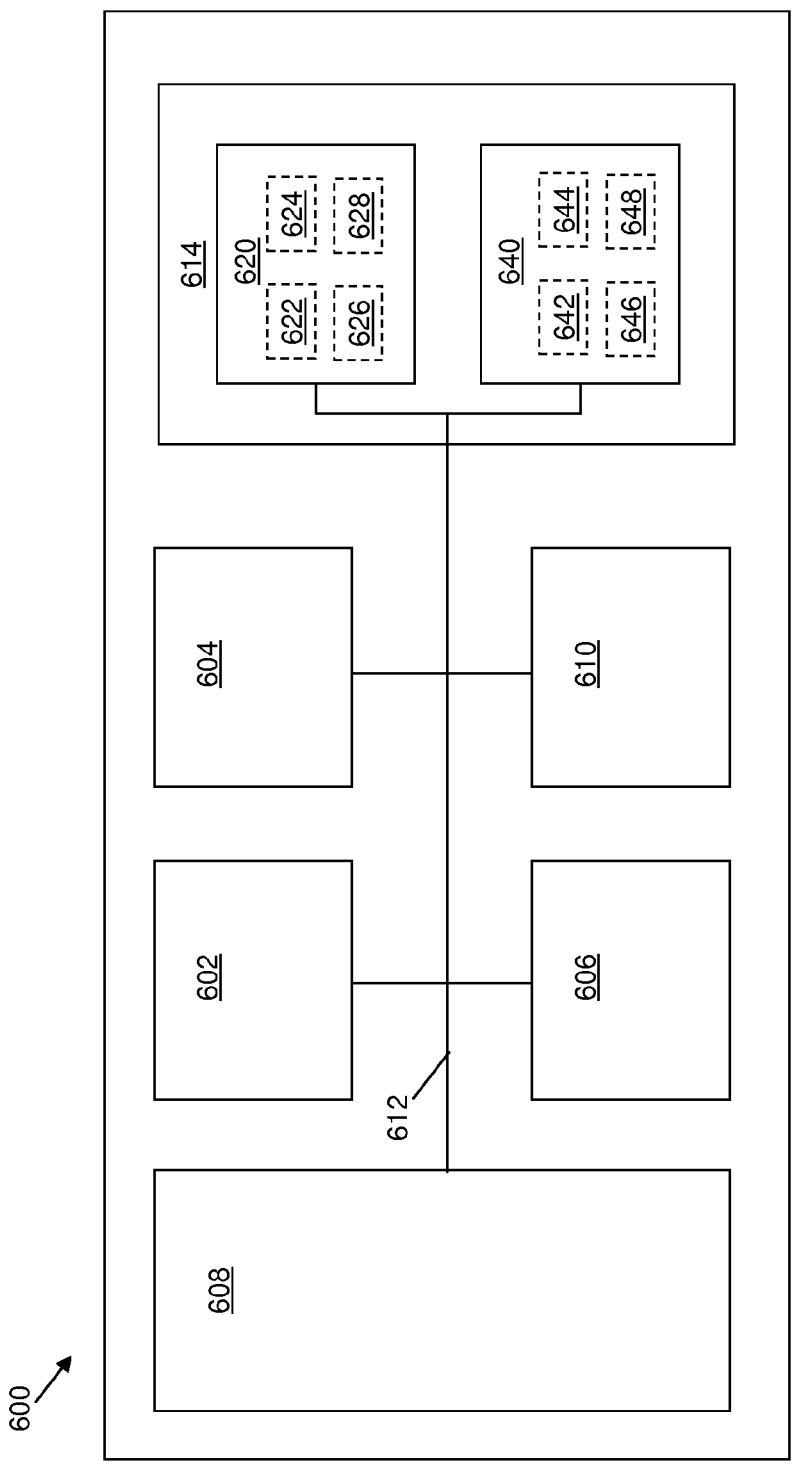
FIG. 7 is a block diagram of a computer device for implementing the system for monitoring and control of a plurality of field devices according to an embodiment of the present invention.

An exemplary block diagram of a computer system 600 in which the module(s) for monitoring and control according to the present invention can be implemented is shown in FIG. 7. Computer system 600 includes a processor 602, such as a central processing unit, an input/output interface 604 and support circuitry 606. In certain embodiments, where the computer 600 requires direct human interaction, a display 608 and an input device 610 such as a keyboard, mouse or pointer are also provided. The display 608, input device 610, processor 602, input/output interface 604 and support circuitry 606 are shown connected to a bus 612 which also connects to a memory 614. Memory 614 includes program storage memory 620 and data storage memory 640. Note that while computer 600 is depicted with direct human interface components display 608 and input device 610, programming of modules and importation and exportation of data can also be accomplished over the interface 604, for instance, where the computer 600 is connected to a network and the programming and display operations occur on another associated computer, or via a detachable input device as is known with respect to interfacing programmable logic controllers.

Program storage memory 620 and data storage memory 640 can each comprise volatile (RAM) and non-volatile (ROM) memory units and can also comprise hard disk and backup storage capacity, and both program storage memory 620 and data storage memory 640 can be embodied in a single memory device or separated in plural memory devices. Program storage memory 620 stores software program modules and associated data. Data storage memory 640 stores data user and/or generated by the one or more modules of the present invention. For instance, program storage memory 620 can include one or more of a safety monitoring and control module 622 (e.g., performing functions carried out by the SLS 32), a process control module 624 (e.g., performing functions carried out by the DCS 42), and intelligent safety and control integrator modules 626 and 628 for performing safety and process control integration and coordination (e.g., as carried out by the ISCI-S and ISCI-C 162, 172). Data storage memory 640 can include field device data 642, complementary field device data 644, user-defined instructions 646 and delegated complementary field device data 648.

It is to be appreciated that the computer system 600 can be any computer such as a personal computer, minicomputer, workstation, mainframe, a dedicated controller such as a programmable logic controller, or a combination thereof. While the computer system 600 is shown, for illustration purposes, as a single computer unit, the system may comprise a group/farm of computers which can be scaled depending on the processing load and database size, e.g., the total number of field devices and amount of field device data required to maintain the system. The computer system 600 can serve as a common multitasking computer that performs the functions of one or more of SLS 32, DCS 42, ISCI-S 162 and/or ISCI-C 172.

The computing device 600 preferably supports an operating system, for example, stored in program storage memory 640 and executed by the processor 602 from volatile memory. According to an embodiment of the invention, the operating system contains instructions for interfacing the device 600 to the ADCMs 159 and the ISDMs 157 of the safety subsystem 130 and the process control subsystem 140.

Referring to FIG. 8, a process flowchart of steps carried out in an embodiment 700 of the present invention. One or more of the computer devices, including one or both of the ISCI units, the SLS, the DCS, or a computer 600 integrating one or more functions of the ISCI units, the SLS and/or the DCS, continuously monitors the conditions of the field devices, as indicated at flowchart process step 702. If it is determined that there is a field device fault condition, e.g., at query block 704, or that a field device is undergoing maintenance, e.g., at query block 706, then functions of the compromised field device are delegated to its complementary field device, as indicated at block 708. The complementary field device data 712 includes a comprehensive mapping of the individual processes or subprocesses and their safety field devices and process control field devices, along with correlations between complementary field devices for particular processes or subprocesses. If no fault condition is determined at query block 704, or if there is no maintenance as determined at query block 706, separation of the safety subsystem field devices and the process control subsystem field devices is maintained as indicated at block 710.

Referring now to FIG. 9, an integrated system 800 is provided for improving the efficiency of equipment maintenance and tracking. The monitoring and control system 100 and an equipment maintenance and tracking system 892 are in communication. In particular, in the event that a field device fault is detected by the system 100, e.g., by SLS 32, ISCI-S 162, DCS 42 and/or ISCI-C 172, or another device such as computer 600 performing the function of one or more of SLS 32, ISCI-S 162, DCS 42 and ISCI-C 172, such information is conveyed to the equipment maintenance and tracking system 892. Likewise, when a faulty field device is repaired or replaced based on detection and notification by the system 100, this information (e.g., the replacement device data including date placed in service, identification number, and associated SIF or control loop so that any scheduled functional testing can be adjusted as required) is stored in the appropriate computer memory of system 100 and shared with the equipment maintenance and tracking system 892.

FIG. 10 is a process flow diagram 900 of an equipment maintenance and tracking process in which information from the monitoring and control system 100 concerning repaired or replaced field devices is communicated to the equipment maintenance and tracking system 892. When one or more of the components of system 100, e.g., the SLS 32, ISCI-S 162, DCS 42 and/or ISCI-C 172, or another device such as computer 600 performing the function of one or more of SLS 32, ISCI-S 162, DCS 42 and ISCI-C 172, receives information from the field device interfaces that a field device is faulty, instructions are generated to test, and if necessary, repair or replace that field device, as indicated at process step 902. This testing and, if necessary, repair or replacement, occurs independent of work order-prescribed functional testing mandated by the equipment maintenance and tracking system 892. In prior art equipment maintenance and tracking systems, information about the testing and any repair or replacement is maintained within the SLS 32, the DCS 42, or other data system, but has not been shared with the equipment maintenance and tracking system. As a result, when work order-prescribed functional testing occurred, the field device that has been recently replaced will be unnecessarily tested, wasting time and resources and exposing workers to additional risk. According to the present invention, information about the tested field device, including confirmation as to whether it was repaired or replaced, or whether the test indicated no fault, is transmitted, as indicated at block 904, to the equipment maintenance and tracking system 892 where the data fields for that device are appropriately updated with the new status information.

Accordingly, when the equipment maintenance and tracking system 892 generates the work order that would have included work order-prescribed functional testing of the tested, replaced or repaired field device, a modified work order will be provided that takes into consideration the fact that said field device has undergone functional testing, is recently repaired, or is a new device, and, based on predetermined user-defined parameters and protocols, the modified work order can eliminate that field device for testing or advance the date of functional testing, as indicated at block 906. This ensures that field devices that have not been tested based on instructions from a component of system 100 are tested prior to testing of previously-tested field devices.

FIG. 11 is another process flow diagram 950 of an equipment maintenance and tracking process in which information from the monitoring and control system 100 concerning repaired or replaced field devices is communicated to the equipment maintenance and tracking system 892. When coordination is possible between emergency shutdown system and the control system, and maintenance history is available, the scheduled maintenance can be adjusted without impacting the reliability or affecting the risk level of the safety system or safety instrumented function. In prior art systems, maintenance of final elements such as valves is conducted periodically without factoring in actual maintenance history. However, according to system and method of the present invention, when maintenance history is factored in, and with the available information of additional final elements from the control system that can be utilized, the level of periodic maintenance can be reduced. For instance, each safety valve can be maintained once per year rather than once per quarter according to the prior art approach. When one or more of the components of system 100, e.g., the SLS 32, ISCI-S 162, DCS 42 and/or ISCI-C 172, or another device such as computer 600 performing the function of one or more of SLS 32, ISCI-S 162, DCS 42 and ISCI-C 172, receives information from the field device interfaces that a field device has been subjected to maintenance or replacement, instructions are generated to eliminate the need for routine scheduled testing, as indicated at process step 952. This testing and, if necessary, maintenance, repair or replacement, occurs independent of work order-prescribed functional testing mandated by the equipment maintenance and tracking system 892. In prior art equipment maintenance and tracking systems, information about the testing and any repair or replacement is maintained within the SLS 32, the DCS 42, or other data system, but has not been shared with the equipment maintenance and tracking system. As a result, when work order-prescribed functional testing occurred, the field device that has been recently replaced will be unnecessarily tested according to the routine schedule test, wasting time and resources and exposing workers to additional risk. According to the present invention, information about the tested field device, including confirmation as to whether it was maintained, repaired or replaced, or whether the test indicated no fault, is transmitted, as indicated at block 954, to the equipment maintenance and tracking system 892 where the data fields for that device are appropriately updated with the new status information.

Accordingly, when the equipment maintenance and tracking system 892 generates the work order that would have included routine scheduled functional testing of the tested, maintained, replaced or repaired field device, a modified work order will be provided that takes into consideration the fact that instructions have been generated to by-pass routine functional testing, as indicated at block 956.

The embodiments of FIGS. 10 and 11 are particularly useful when the final control elements include integrated intelligence, such as emergency isolation valves with smart valve controllers used by applicant under the name "SMART ZV" ("SMART ZV"). These emergency isolation valves, if successfully operated as part of unscheduled plant trips or during routine plant operations, have the capability to map the valve travel against time during a safety demand or during routine plant operations. Accordingly, the ability of the final control element to respond during an emergency can be demonstrated, and the need to initiate a scheduled functional test can be eliminated.

FIGS. 12 and 13 illustrate a typical symptom/diagnostic matrix for an ISDM and an ADCM, respectively. Software of the prior art is capable of using device symptoms to diagnose faults. In accordance with the present invention, this function is performed at the field device level using an integrated circuit device. The diagnostic matrixes for process sensors and final elements can be implemented at the ISDM or ADCM. The diagnostic matrixes are used to determine when a device is in a degraded or fault state. Once a fault state is determined, the ISCI-C or ISCI-S is updated with the fault state information so the complimentary device can be identified and utilized if it is available. Device fault information is communicated to the ISCI-C or ISCI-S to identify when a device fault was detected and to take appropriate steps to keep the process under control and in a safe state. A device that is "shared" when the corresponding device is in a faulty state, can be alarmed so as to avoid taking the device out of service.

An additional benefit of the present invention is that the increased computational power of the field device interface units improves the diagnostics capability, providing for the automatic detection of dangerous faults on a continuous basis. This reduces the need for maintenance personnel to perform routine maintenance inspection and testing of the automated process control field devices, providing for more rapid detection of faults, thereby reducing exposure of personnel to hazardous field conditions and reducing the risk of human error that can lead to equipment outages.

A further benefit of the present invention is that costs can be minimized during the design phase of a plant, since by knowing that a safety system can use field devices of a control system, fewer total sensors or field devices can be designed and planned for to meet the reliability and safety requirements for the safety system.

The system and method of the present invention have been described above and with reference to the attached drawings; however, modifications will be apparent to those of ordinary skill in the art and the scope of protection for the invention is to be defined by the claims that follow.

We claim:

1. An integrated monitoring and control system and equipment maintenance and tracking system for managing a plurality of field devices, the field devices including safety subsystem field devices associated with one or more processes or subprocesses and process control subsystem field devices associated with one or more of the processes or subprocesses, the integrated monitoring and control system and equipment maintenance and tracking system comprising:
    a monitoring and control system including
        a monitoring and control system memory that stores
            safety subsystem field device data and
            process control subsystem field device data,
        a monitoring and control system processor coupled to the monitoring and control system memory;
        a status receiving module executable by the processor for receiving a signal from a compromised field device; and
        an instruction generating module executable by the monitoring and control system processor for generating instructions to test, repair or replace the compromised field device; and
    an equipment maintenance and tracking system in communication with the monitoring and control system including
        an equipment maintenance and tracking system memory that stores field device maintenance work orders;
        an equipment maintenance and tracking system processor coupled to the equipment maintenance and tracking system memory; and
        a maintenance work order modification module executable by the equipment maintenance and tracking system processor that modifies a work order for the compromised field device, or a field device at a location of the compromised field device, based on instructions generated by the instruction generating module of the monitoring and control system processor.

2. The integrated monitoring and control system and equipment maintenance and tracking system of claim 1, wherein the instruction generating module of the monitoring and control system generates instructions based upon the date the compromised field device has undergone functional testing.

3. The integrated monitoring and control system and equipment maintenance and tracking system of claim 1, wherein the instruction generating module of the monitoring and control system generates instructions based upon the date the compromised field device has undergone repair.

4. The integrated monitoring and control system and equipment maintenance and tracking system of claim 1, wherein the instruction generating module of the monitoring and control system generates instructions based upon the date the compromised field device has been replaced.

5. An integrated monitoring and control system and equipment maintenance and tracking system for managing a plurality of field devices, the field devices including safety subsystem field devices associated with one or more processes or subprocesses and process control subsystem field devices associated with one or more of the processes or subprocesses, the integrated monitoring and control system and equipment maintenance and tracking system comprising:

a monitoring and control system including a monitoring and control system memory that stores safety subsystem field device data and process control subsystem field device data, a monitoring and control system processor coupled to the monitoring and control system memory;

a status receiving module executable by the processor for receiving a signal from a compromised field device; and an instruction generating module executable by the monitoring and control system processor for generating instructions to test, repair or replace the compromised field device; and an equipment maintenance and tracking system in communication with the monitoring and control system including an equipment maintenance and tracking system memory that stores a field device routine maintenance schedule;

an equipment maintenance and tracking system processor coupled to the equipment maintenance and tracking system memory; and a schedule modification module executable by the equipment maintenance and tracking system processor that modifies the field device routine maintenance schedule for the compromised field device, or a field device at a location of the compromised field device, based on instructions generated by the instruction generating module of the monitoring and control system processor.

6. The integrated monitoring and control system and equipment maintenance and tracking system of claim 5, wherein the instruction generating module of the monitoring and control system generates instructions based upon the date the compromised field device has undergone functional testing.

7. The integrated monitoring and control system and equipment maintenance and tracking system of claim 5, wherein the instruction generating module of the monitoring and control system generates instructions based upon the date the compromised field device has undergone repair.

8. The integrated monitoring and control system and equipment maintenance and tracking system of claim 5, wherein the instruction generating module of the monitoring and control system generates instructions based upon the date the compromised field device has been replaced.

* * * * *